(12) United States Patent
Malmberg

(10) Patent No.: US 10,208,446 B2
(45) Date of Patent: Feb. 19, 2019

(54) FENDER SYSTEM

(71) Applicant: AB Halmstads Gummifabrik, Halmstad (SE)

(72) Inventor: Mats Malmberg, Rydsgård (SE)

(73) Assignee: AB Halmstads Gummifabrik, Halmstad (SE)

( * ) Notice: Subject to any disclaimer, the term of this patent is extended or adjusted under 35 U.S.C. 154(b) by 0 days.

(21) Appl. No.: 15/544,251

(22) PCT Filed: Jan. 19, 2016

(86) PCT No.: PCT/SE2016/050028
§ 371 (c)(1),
(2) Date: Jul. 17, 2017

(87) PCT Pub. No.: WO2016/122376
PCT Pub. Date: Aug. 4, 2016

(65) Prior Publication Data
US 2018/0016761 A1  Jan. 18, 2018

(30) Foreign Application Priority Data

Jan. 26, 2015 (SE) ...................................... 1550077

(51) Int. Cl.
*B63B 59/02* (2006.01)
*E02B 3/26* (2006.01)

(52) U.S. Cl.
CPC ................ *E02B 3/26* (2013.01); *B63B 59/02* (2013.01); *Y02A 30/36* (2018.01)

(58) Field of Classification Search
CPC .................................. E02B 3/26; B63B 59/02

USPC ......................................................... 114/219
See application file for complete search history.

(56) References Cited

U.S. PATENT DOCUMENTS

| 3,563,525 | A | * | 2/1971 | Narabu | ..................... E02B 3/26 267/140 |
| 3,948,500 | A | * | 4/1976 | Korbuly | .................... E02B 3/26 267/140 |
| 3,999,497 | A |   | 12/1976 | Hamel | |
| 4,601,611 | A | * | 7/1986 | Tagomori | .................. E02B 3/26 405/215 |
| 5,361,715 | A | * | 11/1994 | Kiedaisch | ............... B63B 59/02 114/219 |

(Continued)

FOREIGN PATENT DOCUMENTS

| JP | 4970697 | 6/1974 |
| WO | 1997001479 A1 | 1/1997 |
| WO | 2006067237 A1 | 6/2006 |

OTHER PUBLICATIONS

International Search Report for PCT/SE2016/050028 dated Apr. 14, 2016 5 pages.

(Continued)

*Primary Examiner* — S. Joseph Morano
*Assistant Examiner* — Jovon E Hayes
(74) *Attorney, Agent, or Firm* — Lowe Graham Jones PLLC

(57) ABSTRACT

The present invention concerns a fender system comprising one or more fenders (2). The one or more fenders (2) are to be fastened to a quay wall (1). The fender system further comprises a panel (4) carrying one or more shields. The panel (4) is fastened to the one or more fenders (2). Each fender (2) is formed of two or more fender sections (5, 6).

14 Claims, 3 Drawing Sheets

(56) References Cited

U.S. PATENT DOCUMENTS

| | | | | |
|---|---|---|---|---|
| 5,458,077 A * | 10/1995 | Enami | ............ | E02B 3/26 |
| | | | | 114/219 |
| 6,533,258 B2 * | 3/2003 | Monson | ............ | F16F 1/374 |
| | | | | 267/141 |
| 6,572,307 B2 * | 6/2003 | Tajima | ............ | E02B 3/26 |
| | | | | 405/212 |
| 6,701,860 B2 * | 3/2004 | Malmberg | ............ | E02B 3/26 |
| | | | | 114/219 |

OTHER PUBLICATIONS

EPO European Search Report; PCT/SE2016/050028; dated Aug. 27, 2018; 8 pages.

* cited by examiner

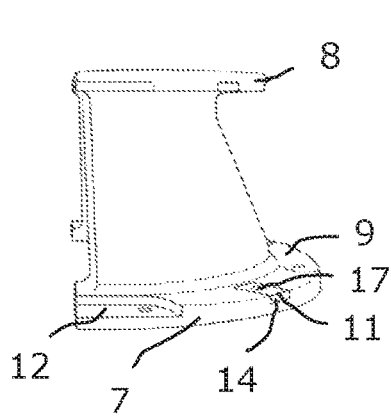
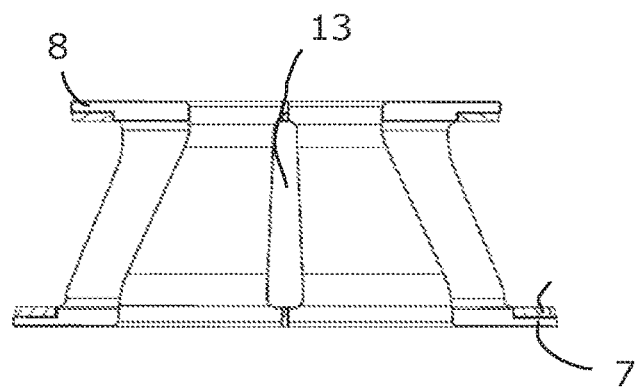
Fig. 3    Fig. 4
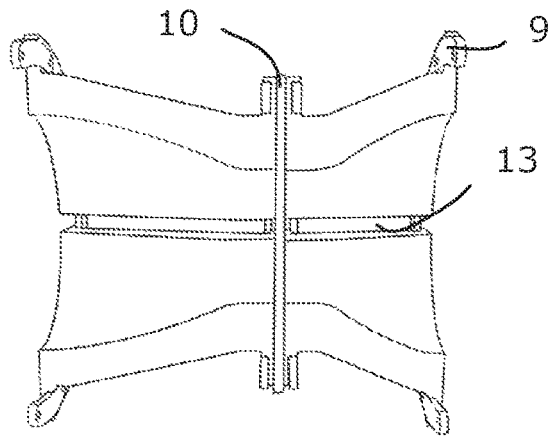
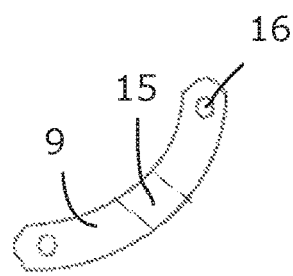
Fig. 5    Fig. 6
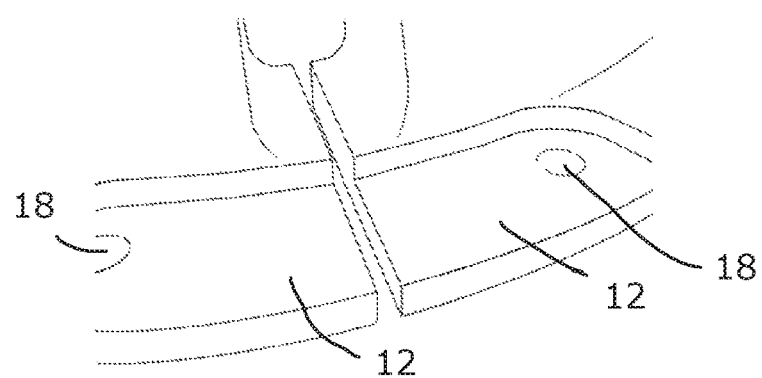
Fig. 7

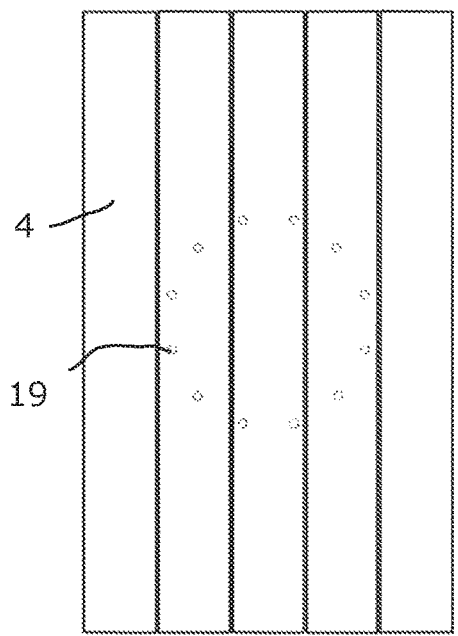
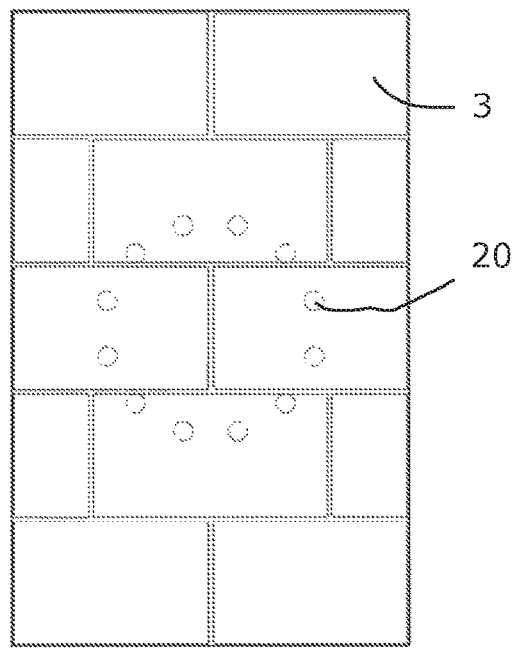
Fig. 8
Fig. 9
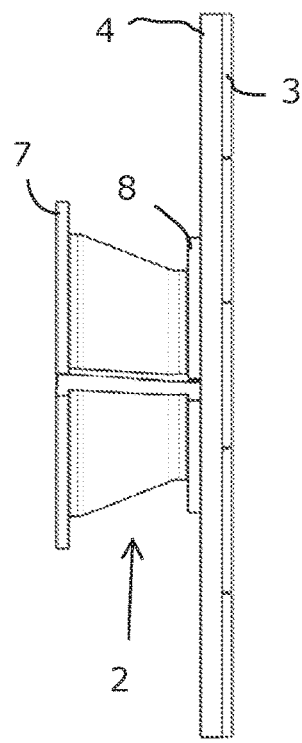
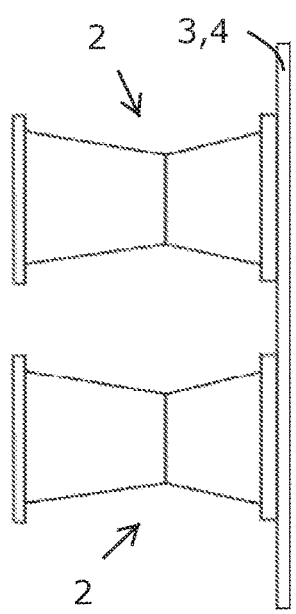
Fig. 10
Fig. 11

FENDER SYSTEM

PRIORITY CLAIMS

This invention claims priority to PCT Application Serial No. PCT/SE2016/050028 filed Jan. 19, 2016, which claims priority to Swedish Application Serial No. 1550077-0 filed Jan. 26, 2015; the contents of which are hereby incorporated by reference.

TECHNICAL FIELD

The present invention concerns a modular fender system.

BACKGROUND

Fenders are used to prevent damage to boats, vessels and berthing structures. To do this, fenders usually have high energy absorption and low reaction force. In berthing a fender is used to absorb the kinetic energy of a boat or vessel berthing against a jetty, quay wall or other vessel. The fender system of the present invention is to be placed at a quay and is mainly intended for harbours receiving relatively large ships or vessels.

To protect both the vessels and the quay, fenders are placed at the quay wall. The fenders are facing out of the quay wall and are to absorb the impact of a berthing vessel. For large vessels fender systems are normally used, wherein one or more fenders carry some kind of shield. One or more shields are to abut the side of the ship and at least parts to be facing a vessel are made of a material that will not damage the side of the berthing vessel. The shields should have relatively low surface friction. The fenders used are normally made in one piece and may be relatively heavy and cumbersome to handle.

Depending on the size of the vessel the impact to be absorbed will vary. If vessels of a larger size than vessels previously received at a specific quay are to be received, it may be necessary to replace the existing fenders. The fenders may also need to be replaced depending on the type of vessel to be received at the quay. For example cruising ships may need another type of shock absorbing than a cargo ship. During the time the fenders are replaced said quay or part of a quay cannot be used. Replacement of broken fenders may also be needed from time to time. Time at which a quay cannot be used means that cargo cannot be loaded or unloaded from vessels, which can be very costly.

From a port engineering perspective there are some problems with fender assembly for the fender systems used today. The fenders are made in one piece and both the shield and the fenders are relatively heavy, making it cumbersome to handle such a fender system, both at mounting and transporting. The fenders have normally an inner void, which is open at the ends of the fender. This may lead to build up of pressure inside the fender at berthing, due to possible assembly of water and ice inside the fender. Such build up of pressure may lead to damages both to the fender system and the vessel. If water or ice is assembled inside a fender the absorbing characteristics of the fender will be affected in that it will make the fender stiffer.

SUMMARY

In view of the above it is beneficial if the downtime of a quay can be shortened.

The present invention is based on the idea of providing a modular fender system. By means of the modular fender system of the present invention, it is relatively easy to replace broken parts if needed, to exchange fenders depending on the vessel to be received at the dock. The fenders of the fender system are formed of a number of fender sections or modules. Handling is facilitated in that fender sections are used, having a relatively low weight compared to the fenders usually used today, which are in one piece.

By means of the fender sections it is not necessary to replace a complete fender if only a part of the fender is broken.

By making the shields of material of a low weight, such as aluminium, composite material, plastic or a combination of these materials, handling of the shields is facilitated. It is at least facilitated compared to previous shields normally having parts made of a steel structure. By making the shields in the form of modules it is possible to replace only parts of a shield, if needed. The modules also make it fairly easy to adjust the dimensions of the shield both in length and width.

Further objects and advantages of the present invention will be obvious to a person skilled in the art when reading the detailed description below of embodiments of the invention.

BRIEF DESCRIPTION OF THE DRAWINGS

The invention will be described further below by way of example and with reference to the enclosed drawings. In the drawings:

FIG. 3 is a side view of two sections of a fender of the present invention FIG. 4 is a side view from another direction of the fender sections of FIG. 3, FIG. 5 is a side view of parts of two combined fenders, FIG. 6 is a plan view of a connecting piece, FIG. 7 is an enlarged view of parts of two fender sections, FIG. 8 is a plan view of a panel of a shield of the fender system, FIG. 9 is a plan view of a plate of a shield, FIG. 10 is a side view of one embodiment of a fender system, and FIG. 11 is a side view of a further embodiment of a fender system.

DETAILED DESCRIPTION

Figure 1:
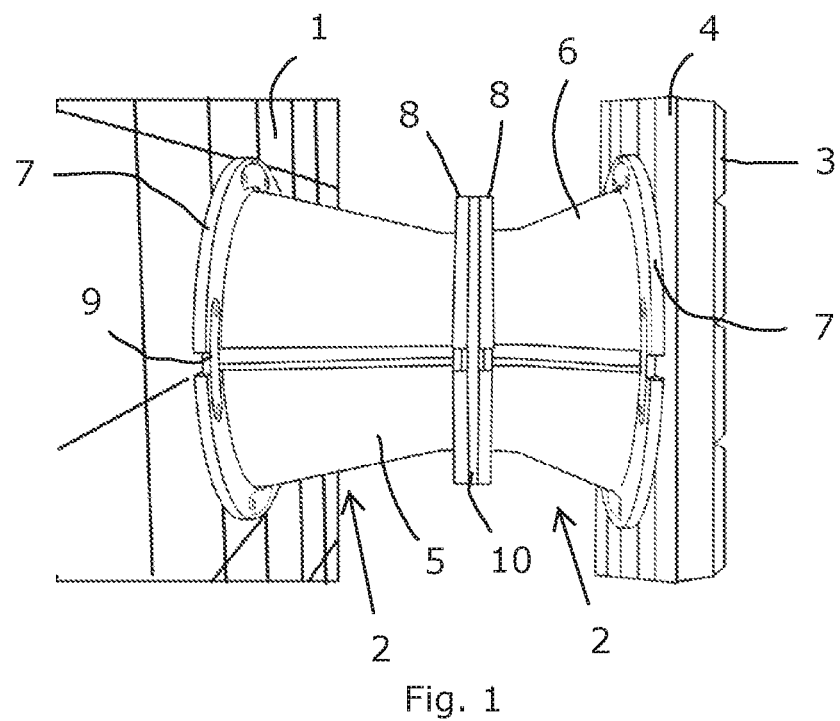
FIG. 1 is a perspective view of the fender system of the present invention fastened to a quay wall.
Figure 2:
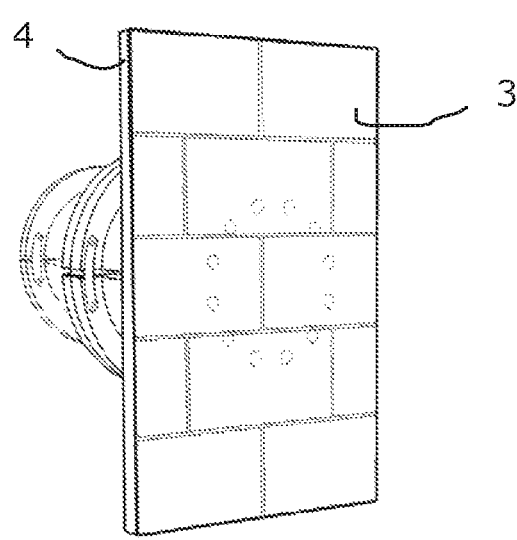
FIG. 2 is a perspective view of the fender system of FIG. 1.

The fender system of the present invention is shown fastened at a quay wall 1. The fender system comprises at least one fender 2 and at least one shield. The at least one shield has one or more plates 3, placed on a panel 4, which panel 4 is fastened to the at least one fender 2. Normally, a number of plates 3 are placed on the panel 4. The number of fenders 2 used depends on the size of the frame 4 and also on the size of the vessels to be received by the fender system.

Each fender 2 is formed of four fender sections 5, 6 or modules in the shown embodiment. Each formed fender 2 has the form of a truncated cone, which has an open through space in the centre. The fender sections 5, 6 forming one fender 2 are identical and each is forming a quarter of the fender 2. The fender sections 5, 6 have two flanges 7, 8 at opposite ends of a wall. The flanges 7, 8 have a curvature form. The flange 7 at one end of the formed fender 2 has a larger outer diameter than the flange 8 at the other end of the formed fender 2. The flange 7 of the fender 2 having the larger diameter is to be facing the quay wall 1.

The fender sections 5, 6 are held together by means of a number of connecting pieces 9. Said connecting pieces 9 are received in recesses 12 in the flanges 7, 8. Each connecting piece 9 has a curved shape, following the curvature of the flanges 7, 8 of the fender sections 5, 6, and with through holes 16 at opposite ends. Each connecting piece 9 is to bridge two fender sections 5, 6, whereby it is fastened to respective fender section 5, 6 by means of screws received in the through holes 16. The through holes 16 of the connecting piece 9 are placed in line with through holes 18 in the recesses 12 of the flanges 7, 8. The screws received in the through holes 16 of the connecting pieces 9 are also going through the through holes 18 of the recesses 12. Thus, the function of said screws is both to connect fender sections 5, 6 and to fastened the fender sections 5, 6 to the quay 1. An integrated boss 15 of the connecting piece 9 is placed in the middle and protruding at one side. Said boss 15 of the connection piece 9 is to go down between the fender sections 5, 6. The holes 18 of the fender sections 5, 6 and the holes 16 of the connecting pieces 9 are placed to give a gap 13 between adjacent fender sections. The boss 15 of each connecting piece 9 will assist in keeping the gap 13 between adjacent fender sections 5, 6. The gaps 13 will hinder water from accumulating inside the formed fender 2. Water trapped inside a fender will also affect the absorbing characteristic of the fender. Water trapped inside the fender is a disadvantage to the load-deflection curve of the fender, as it will make the fender stiffer.

Washers 11 are placed in recesses 14 in the flanges 7, 8. The washers 11 have through holes 17, which holes 17 are placed in line with through holes in the flanges 7, 8. The fenders 2 will be fastened to the quay wall 1 and panel 4, respectively, by means of screws received in said holes of the washers 11 and the flanges 7, 8, respectively. Also the screws received in the through holes 16 of the connecting pieces 9 are used to fasten the fenders 2 to the quay wall 1 and panel 4, respectively.

The fenders 2 may have different sizes. In the shown embodiment the fender sections 5 can for example have a height of 600 mm and the fender sections 6 can have a height of 400 mm. The height in this case is the distance the fenders 2 will protrude from the quay wall 1. A person skilled in the art realizes that fender sections having other heights may also be used. Two fenders 2 may be connected to each other end at end. The fenders 2 are connected to each other with the flanges 8 having the smaller diameter facing each other. In connecting two fenders 2, an intermediate ring 10 is placed between the fenders 5, 6 and screws are received going through the holes 16 of the connecting pieces 9 of respective fender 2 and the intermediate ring 10. With fender sections 5, 6 having a height of 600 mm and 400 m, the height of the fenders 2 may be about 400 mm, 600 mm, 800 mm, 1000 mm or 1200 mm, depending on whether one fender 2 or two interconnected fenders 2 are used. In the stated examples of heights, the thickness of the intermediate ring 10 is not included in the height of two interconnected fenders 2. The thickness of the intermediate ring 10 is only a small fraction of the total height of two interconnected fenders 2. Irrespectively of the height of the fender sections 5, 6 the different outer diameter of the flanges 7, 8 are the same for the different formed fenders 2. Thus, for fender sections 6 having a less height the inclination of the truncated cone will be larger than for fender sections having a larger height.

The fenders 2 may be made of material having different hardness. For example the fender sections 5 having larger height may be made in a relatively soft material, while the fender sections 6 having a smaller height may be made in a relatively hard material. By varying the hardness of respective fender section 5, 6 and the load distribution for the part between the flanges 7, 8, it is possible to control the load-displacement curve of the fender 2. It is also possible to vary the thickness of the walls of the fender sections 5, 6 in order to control the load-displacement curve of the fender 2.

In use one or more fenders 2 are fastened to the quay wall 1. Either the four fender sections 5, 6 are assembled to form each fender 2, before fastening it to the quay wall 1, or one fender section 5, 6 is first fastened to the quay and then the other fender sections 5, 6 are fastened to the quay wall 1 and adjacent fender sections 5, 6. If a further fender 2 is to be attached to the first fender 2, it is also attached to the first fender either as one unit or one fender section 5, 6 at the time. As indicated above an intermediate ring 10 is placed between the fenders 2, when assembling two fenders 2 to one unit.

After having fastened the one or more fenders 2 to the quay wall 1, the shield 3 is attached to the one or more fenders 2. The shield is to face the side of the berthing vessel. The size of the shield is dictated by the size, tonnage etc. of the vessel.

Thanks to the relative low weight of the different parts of the fender system, there is no need for heavy machinery in handling the different parts. This facilitates replacement of broken parts. The modularity of the fender system also facilitates replacement of broken parts. If only one fender section 5, 6 of the frame system of the present invention need to be replaced, only said fender section 5, 6 is removed while the other fender sections 5, 6 of the fender 2 remain fastened to the quay wall 1. After removal of the broken fender section 5, 6 a new fender section 5, 6 is fastened to the quay wall 1 and adjacent fender sections 5, 6, respectively. Also the panels of the shield 3 may easily be replaced if needed. The panels may be needed to replace due to being broken or losing the surface friction.

Depending on the expected load one or more fenders 2 are used to carry one shield. If several fenders 2 are used they may be placed one above the other and/or side by side with some distance between adjacent fenders 2. One example of an embodiment having fenders 2 placed above each other is illustrated in FIG. 11.

Normally a number of fender systems are placed along the quay wall 1, in order to be able to support vessels of different lengths.

In one embodiment the shield of the fender system is formed of a panel 4 carrying a plate 3. In FIG. 8 the panel 4 is shown. The panel 4 has a number of holes 19, by means of which the plate 3 may be fixed to the panel 4. The holes 19 are placed at equal distance from each other on a circle. In FIG. 9 the plate 3 is shown. The plate 3 is made of a plastic material in one embodiment. The plate 3 has a number of holes 20 placed to correspond with the holes 19 of the panel 4. Thus, the holes 20 of the plate 3 are placed at equal distance from each other on a circle. The plate 3 is fixed to the panel 4 by means of screws (not shown). The screw heads are received inside the holes 20 of the plate 3. The plates 3 are to abut the vessel at berthing and are made of the same plastic material that is commonly used today.

Each shield may have a number of plastic plates 3, to be facing the vessel. The plastic plates 3 may have a standard dimension. Based on the choice of number of plastic plates 3 the dimensions of the panel 4 are decided. The modular build-up of the shield makes it easy to replace parts of it, if needed. It will normally not be necessary to replace the entire shield.

The invention claimed is:

1. A fender system comprising one or more fenders, which one or more fenders are to be fastened to a quay wall, a panel carrying one or more shields, which panel is fastened to the one or more fenders, characterized in that each fender is formed of two or more fender sections connected to each other by means of connecting pieces received in recesses of the flanges, each connecting piece is bridging two fender sections wherein each connecting piece has a curved form, following the curvature of the flanges of the fender sections, and that each fender has the form of a truncated cone and has a flange at each end.

2. The fender system of claim 1, wherein each fender is formed of four identical fender sections forming a quarter of the fender.

3. The fender system of claim 1, wherein one flange has a larger outer diameter than the other flange and wherein the flange having the larger diameter is to be facing the quay.

4. The fender system of claim 1, wherein each connecting piece has through holes at opposite ends and wherein the through holes of the connecting piece are placed in line with through holes of the respective flange, wherein the fender sections are connected to each other by means of the connecting pieces in such a way that a gap is formed between adjacent fender sections in the formed fender and wherein each connecting piece has a boss protruding from one side of the connecting piece going into the gap between adjacent fender sections.

5. The fender system of claim 4, wherein fastening screws goes through the through holes of the connecting pieces and through the through holes of the flange and into the quay wall.

6. The fender system of claim 4, wherein washers are received in recesses of the flanges of the fenders, wherein each washer has a through hole placed in line with a through hole in the recess of the flange for receiving fastening screws going through the through holes in the washer and the flange, respectively.

7. The fender system of claim 3, wherein two fenders are connected to each other with the flanges having the smaller diameters facing each other and wherein an intermediate ring is placed between the two fenders connected to each other.

8. The fender system of claim 7, wherein fenders of different height are connected to each other.

9. The fender system of claim 8, wherein fenders having different material characteristics and/or having different wall thicknesses are connected to each other.

10. The fender system of claim 1, wherein each shield comprises one or more plates fastened on said panel having a modular form.

11. The fender system of claim 1, wherein two fenders are connected to each other with the flanges having the smaller diameters facing each other and wherein an intermediate ring is placed between the two fenders connected to each other.

12. The fender system of claim 11, wherein fenders of different height are connected to each other.

13. The fender system of claim 12, wherein fenders having different material characteristics and/or having different wall thicknesses are connected to each other.

14. The fender system of claim 2, wherein the four fender sections are connected to each other by means of the connecting pieces.

* * * * *